(12) United States Patent
Winzeler

(10) Patent No.: US 7,182,708 B2
(45) Date of Patent: Feb. 27, 2007

(54) FINAL DRIVE FOR ELECTRIC MOTOR TO WHEEL

(75) Inventor: James E. Winzeler, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 5 days.

(21) Appl. No.: 10/738,442

(22) Filed: Dec. 17, 2003

(65) Prior Publication Data

US 2004/0152557 A1 Aug. 5, 2004

Related U.S. Application Data

(60) Provisional application No. 60/435,962, filed on Dec. 20, 2002.

(51) Int. Cl.
*B60K 17/06* (2006.01)
*F16H 57/08* (2006.01)

(52) U.S. Cl. ............... 475/337; 475/903; 180/369; 180/372

(58) Field of Classification Search ............ 475/337, 475/903; 180/65.6, 65.7, 369, 372
See application file for complete search history.

(56) References Cited

U.S. PATENT DOCUMENTS

| 3,055,448 | A | * | 9/1962 | Fagel | 180/10 |
|---|---|---|---|---|---|
| 3,115,204 | A | * | 12/1963 | Dence | 180/10 |
| 3,147,635 | A | * | 9/1964 | Fisher | 477/67 |
| 3,334,702 | A | * | 8/1967 | Granryd | 180/243 |
| 3,770,074 | A | * | 11/1973 | Sherman | 180/65.6 |
| 4,142,615 | A | | 3/1979 | Sidles, Jr. et al. | |
| 4,330,045 | A | | 5/1982 | Myers | |
| 4,392,396 | A | | 7/1983 | Sato et al. | |
| 4,437,530 | A | | 3/1984 | DeYoung et al. | |
| 4,448,092 | A | | 5/1984 | Binger | |
| 4,662,246 | A | | 5/1987 | Cheek et al. | |
| 4,702,125 | A | | 10/1987 | Kalns | |
| 4,873,894 | A | | 10/1989 | Avery et al. | |
| 5,674,148 | A | | 10/1997 | Bouteille | |
| 5,718,300 | A | | 2/1998 | Frost | |
| 5,813,488 | A | | 9/1998 | Weiss | |
| 6,139,464 | A | | 10/2000 | Roske | |
| 6,148,941 | A | | 11/2000 | Hinton et al. | |
| 6,318,200 | B1 | | 11/2001 | Coleman et al. | |

FOREIGN PATENT DOCUMENTS

| EP | 0117945 A2 | | 12/1984 | |
|---|---|---|---|---|
| GB | 2156475 | * | 10/1985 | 475/337 |
| JP | 54-50758 | * | 4/1979 | 475/337 |
| JP | 56-39343 | * | 4/1981 | 475/337 |

* cited by examiner

*Primary Examiner*—Ha Ho
(74) *Attorney, Agent, or Firm*—Steven M. Hanley

(57) ABSTRACT

A final drive assembly for transmitting torque between an input and an output includes a compound gear assembly. The compound gear assembly includes at least three planetary gear trains and is in driving engagement with the input. Each planetary gear train of the at least three planetary gear trains is adapted to coactively and drivingly engage the output, wherein torque generated by the input is distributed to the output by each of the planetary gear trains.

20 Claims, 2 Drawing Sheets

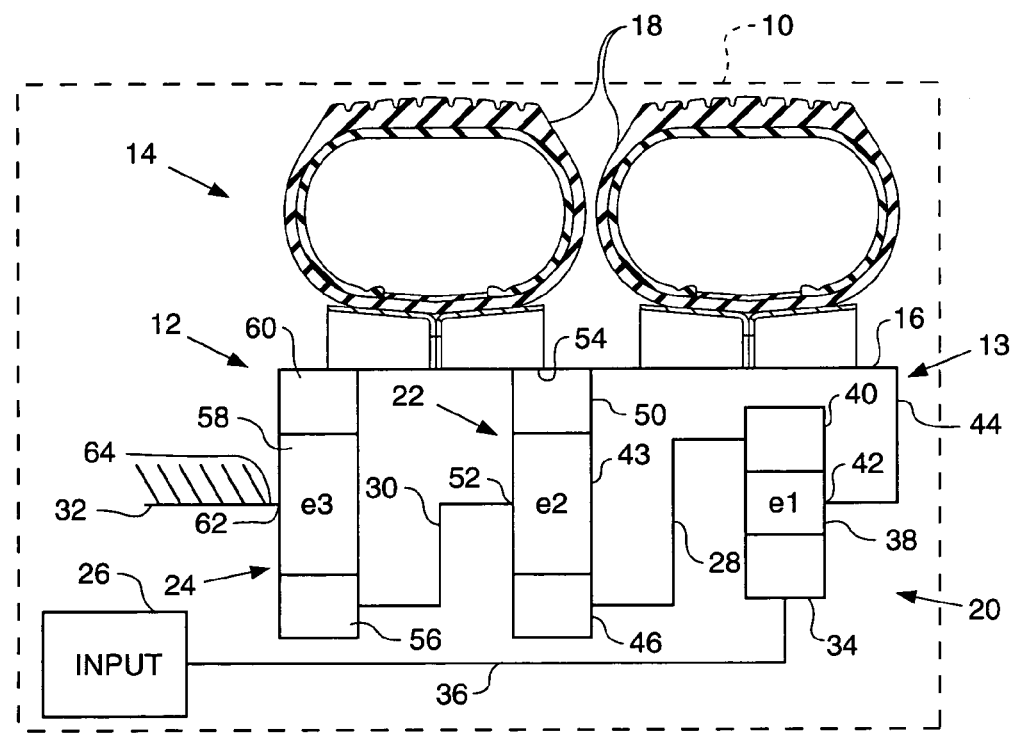
Fig-1-
Fig-2-
|  | LET E3 = | 3 |  |  |  |
|---|---|---|---|---|---|
|  | E2 |  |  |  |  |
| E1 | 2.6 | 2.7 | 2.8 | 2.9 | 3 |
| 2.3 | 34.12 | 35.04 | 35.96 | 36.88 | 37.8 |
| 2.4 | 35.56 | 36.52 | 37.48 | 38.44 | 39.4 |
| 2.5 | 37 | 38 | 39 | 40 | 41 |
| 2.6 | 38.44 | 39.48 | 40.52 | 41.56 | 42.6 |
| 2.7 | 39.88 | 40.96 | 42.04 | 43.12 | 44.2 |
| 2.8 | 41.32 | 42.44 | 43.56 | 44.68 | 45.8 |
| 2.9 | 42.76 | 43.92 | 45.08 | 46.24 | 47.4 |
| 3 | 44.2 | 45.4 | 46.6 | 47.8 | 49 |

FINAL DRIVE FOR ELECTRIC MOTOR TO WHEEL

This application claims the benefit of prior provisional patent application Ser. No. 60/435,962 filed Dec. 20, 2002.

TECHNICAL FIELD

The present invention relates to final drive assemblies and more particularly to modifying an input speed, through a compound epicyclic gear assembly, to provide a desired output speed.

BACKGROUND

It is known to employ relatively high-speed AC motors as one of the primary drivers in power train and transmission design for hybrid or electric type power trains. These types of power trains, especially for use with heavy-duty earth-moving machines, for example, still require gear combinations between the power source and the wheel, typically in the form of a final drive assembly primarily for the purpose of speed reduction. These final drive assemblies require the capability of transferring significant torques in addition to transforming high electric motor shaft speed to a substantially slower axle speed.

Final drives are commonly employed on large earth working machines, such as mining dump trucks for example and typically have at least a pair of driven wheels which are rotatably mounted upon corresponding axle housings or spindles. Each wheel may employ a final drive reduction gear train, such as a double-reduction planetary arrangement, drivingly connected with a cylindrical final drive adapter that partially, if not fully, surrounds the final drive ring gear.

Power to drive such machines is commonly provided by an internal combustion engine which urges rotation of drive axles, provided by the machine, either through a mechanical transmission and differential arrangement or through generation of electrical power to operate electric motors coupled with the drive axles.

As machines increase in size to accommodate larger payloads, the need for more robust drive train components arises, which typically means the use of larger components. For example, it is desirable in trucks which use a planetary final drive to utilize as large a ring gear as reasonably possible to reduce stress on the drive train and increase component life.

Known final drive gear train sets have utilized a Ravigneaux gear set for speed modification between an input an output, however these types of gear sets are complicated (including clutches and multiple gear sets) and are typically expensive to implement. Moreover, these aforesaid gear types often still require additional speed reduction devices attached therewith to attain desirable speed reduction resulting in expensive, complicated and large units.

Another type of final drive assembly is disclosed by U.S. Pat. No. 4,437,530 issued to De Young et al. on Mar. 20, 1984. A pair of coaxially positioned gear sets, provided within a wheel assembly, provide speed reduction between the input and the wheel assembly. Although less complex and likely less expensive than the Ravigneaux gear set, additional speed modification may be necessary to attain desirable rotational speed reduction performance.

The present invention is directed to overcoming one or more of the problems described above.

SUMMARY OF THE INVENTION

The present invention provides, in one embodiment thereof, a final drive assembly for transmitting torque between an input and an output. The final drive includes a compound gear assembly including at least three planetary gear trains and is in driving engagement with the input. Each planetary gear train of the planetary gear trains are adapted to coactively and drivingly engage the output, wherein torque generated by the input is distributed to the output by each of the planetary gear trains.

The present invention further provides a machine having an input including at least one output; and at least one final drive assembly structured and arranged to transmit rotation between the input and the output. The final drive assembly includes a compound gear assembly having at least three planetary gear trains and is in driving engagement with the input. Each planetary gear train of the planetary gear trains is adapted to coactively and drivingly engage the output, wherein torque generated by the input is distributed to the output by each of the planetary gear trains.

BRIEF DESCRIPTION OF THE DRAWINGS

The above-mentioned and other features of this invention, and the manner of attaining them, will become more apparent and the invention itself will be better understood by reference to the following description of the embodiments of the invention taken in conjunction with the accompanying drawings, wherein:

FIG. 1 is schematic and diagrammatic view of a first embodiment of a final drive assembly according to the present invention;

FIG. 2 is a chart showing exemplary overall reduction ratio values for various given ratios for the three gear trains of the final drive assembly of FIG. 1.

Figure 3:
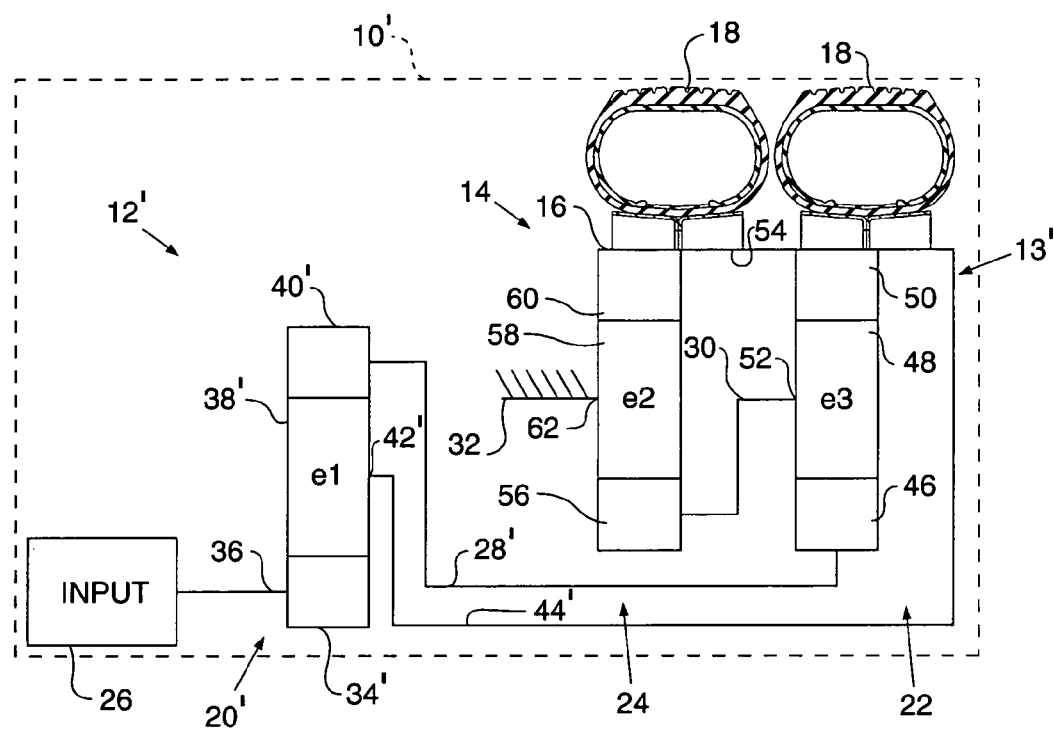
FIG. 3 is schematic and diagrammatic view of a second embodiment of a final drive assembly according to the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention and such exemplifications are not to be construed as limiting the scope of the invention in any manner.

DETAILED DESCRIPTION

Reference will now be made in detail to embodiments of the invention, examples of which are illustrated in the accompanying drawings. Wherever possible, the same or corresponding reference numbers will be used throughout the drawings to refer to the same or corresponding parts.

Referring to FIG. 1, a machine 10 is shown including a first embodiment of a final drive assembly 12 attached thereto. The final drive assembly 12 includes a compound gear assembly 13 engaged with an output or wheel assembly 14. The wheel assembly 14 may include a compound rim assembly 16 being adapted to mount thereon a pair of ground-engaging tires 18, as is customary. In an exemplary embodiment, the wheel assembly 14 is adapted to enclose substantially all of the compound gear assembly 13 therein. Although the wheel assembly 14 is depicted as a tire supporting rim structure combination, it is envisioned that the wheel assembly 14 may also be a mid-roller for a continuous track or belt assembly, or any other ground-engaging output assembly known to those having ordinary skill in the art. Furthermore, although in one exemplary embodiment, the final drive assembly 14 is depicted as providing rotational speed reduction between an input and an output for a ground engaging machine, for example, it is also envisioned that the present invention may be used in accordance with rotational speed amplification between an input and an output for use with machines such as windmills, for example.

The final drive assembly 12 includes the compound gear assembly 13 having a first planetary gear train 20, a second planetary gear train 22 and a third planetary gear train 24. The first planetary gear train 20 may be driveably engaged by an input device 26. The first planetary gear train 20 is also connected to the second planetary gear train 22 through a connecting member 28. In turn, the second planetary gear train 22 is connected to the third planetary gear train 24 through a connecting member 30. The first planetary gear train 20 is in an outboard position, while the third planetary gear train 24 is in an inboard position. The third planetary gear train 24 is connected to ground 32, such as a rigid housing or frame member, for example. Notably, each of the first, second and third planetary gear trains 20, 22 and 24 are respectively connected to the wheel assembly 14. In an exemplary embodiment the second and third planetary gear trains may be coaxially aligned.

The input 26, which may be an electric motor, hydraulic motor, internal combustion engine, or hybrid source, for example, is connected to a sun gear 34 of the first planetary gear train 20 through a drive member 36. The first planetary gear train 20 also includes a planet gear set 38 and a ring gear 40. The planet gear set 38 may include at least three gears each of which being rotatably supported by a carrier 42 through roller bearing assemblies (not shown), as is customary. The planet gear set 38 is supported on the carrier 42 and, in turn, the carrier 42 transmits output torque to the wheel assembly 14 through a connecting member 44. The connecting member 44 may be, for example, a drive shaft arrangement, a fastened joint, a welded joint, a gear set, an integral joint or any other high torque transmitting relationship between the wheel assembly 14 and the carrier 42 known to those having ordinary skill in the power train arts. The planet gear set 38 of the first planetary gear train 20 is in mesh with the ring gear 40. It will be understood that a ratio identified as "$e_1$," represents the number of teeth in the ring gear 40 over the number of teeth in the sun gear 34 such as 3:1, for example.

The ring gear 40 of the first planetary gear train 20 is connected to a sun gear 46 of the second planetary gear train 22 through the connecting member 28. The sun gear 46 of the second planetary assembly 22 is in mesh with a planet gear set 48 and the planet gear set 48 is in mesh with a ring gear 50. The planet gear set 48 may include at least three gears each of which is rotatably supported by a carrier 52 through roller bearing assemblies, as is customary. The planet gear set 48 is supported on the carrier 52 and, in turn, the carrier 52 transmits torque to the third planetary gear train 24 through the connecting member 30. The planet gear set 48 of the second planet gear train 22 is in mesh with the ring gear 50 and the ring gear 50 is attached to an inner portion 54 of the rim assembly 16. A ratio, "$e_2$," represents the number of teeth in the ring gear 50 over the number of teeth in the sun gear 46 and may be 3:1, for example.

The planet gear set 48 of the second planetary gear train 22 is connected to a sun gear 56 of the third planetary gear train 24 through the connecting member 30. The sun gear 56 of the third planetary assembly 24 is in mesh with the planet gear set 58 and the planet gear set 58 is in mesh with a ring gear 60. The planet gear set 58 may include at least three gears each of which being rotatably supported by a carrier 62 through roller bearing assemblies, as is customary. The planet gear set 58 is supported on the carrier 62 and, in turn, the carrier 62 transmits torque to the reaction member 64. The reaction member 64 is attached to the ground 32. The planet gear set 58 is in mesh with the ring gear 60 and the ring gear 60 is attached to the inner portion 54 of the rim assembly 16. A ratio, "$e_3$," represents the number of teeth in the ring gear 60 over the number of teeth in the sun gear 56 and may be 3:1, for example.

Since the carrier 62 of the third planetary gear train 24 is grounded through the reaction member 64, the planet gear set 58 is prevented from orbiting about the sun gear 56. Consequently, rotation of the sun gear 56 causes direct rotation of the ring gear 60. In addition to the third planetary gear train 24 providing direct output to the wheel assembly 14 through its ring gear 60, the second planetary gear train 22 provides direct output to the wheel assembly 14 through its ring gear 50 and the first planetary gear train 20 provides output to the wheel assembly 14 through its carrier member 42 and drive member 44. By splitting the torque transmitting and speed reduction duties between the planetary gear trains, an overall high reduction ratio is achieved using common sized planetary gear train units.

The overall speed reduction of the planetary assembly 12, may be expressed as:

$$\text{Reduction} = e1[1+e2+e2e3+e3]+1$$

Exemplary values for the ratios e1, e2 and e3 and the corresponding reductions are provided in FIG. 2. It will be understood that the present invention contemplates an infinite number of additional values and the fact that exemplary values have been provided in FIG. 2 does not limit the scope of the invention in any manner.

FIG. 3 illustrates a modified embodiment of the machine 10' employing a final drive assembly 12' including a compound gear assembly 13, wherein certain corresponding elements are denoted by primed reference numerals. Referring to FIG. 3, a second embodiment of a final drive assembly 12' is shown and differs from the final drive assembly 12, shown in FIG. 1, in several respects. One such respect includes the first planetary gear train 20' being inwardly positioned relative the wheel assembly 14. As a result, the second planetary gear train 22 may be identified as the outboard planetary and the first planetary gear train 20' may be identified as the inboard planetary.

In an exemplary embodiment, the compound gear assembly 13', includes the first planetary gear train 20', the second planetary gear train 22 and the third planetary gear train 24. The first planetary gear train 20' is driveably engaged by the input 26. The first planetary gear train 20' is also connected to the second planetary gear train 22 through the connecting member 28'. In turn, the second planetary gear train 22 is connected to the third planetary gear train 24 through a connecting member 30. The third planetary gear train 24 is connected to ground 32, such as a rigid housing or frame member, for example. Notably, each of the first, second and third planetary gear trains 20, 22 and 24 are respectively connected to the wheel assembly 14.

The input 26 is connected to the sun gear 34' of the first planetary gear train 20' through a drive member 36'. The first planetary gear train 20' also includes a planet gear set 38' and a ring gear 40'. The planet gear set 38' may include at least three gears each of which is rotatably supported by a carrier 42' through roller bearing assemblies (not shown), as is customary. The planet gear set 38' is supported on the carrier 42' and, in turn, the carrier 42' transmits output torque to the wheel assembly 14 through a connecting member 44'. The connecting member 44' may be, for example, a drive shaft, a fastened joint, a welded joint, a gear set, an integral joint or any other high torque transmitting relationship between the wheel assembly 14 and the carrier 42' known to those having ordinary skill in the power train arts. In an exemplary embodiment, the drive member 36' and the connecting member 28' may be concentric shaft members, for example. The final drive assembly 12' may be utilized, for example, when space within the rim assembly 16 is limited. With the second and third planetary gear trains 22 and 24 enclosed within the rim assembly 16, the first planetary gear train 20' may be positioned apart from the rim assembly 16 and within an axle housing (not shown), for example.

INDUSTRIAL APPLICABILITY

Referring to FIG. 1, in operation the input 26 provides rotation of the sun gear 34 of the first planetary gear train 20 through the drive member 36. This, in turn, causes rotation of the gears within the planet gear set 38 and orbiting of the carrier 42 about the sun gear 34. Since the ring gear 40 is in mesh with the planet gears of the planet gear set 38, it rotates and concomitantly causes rotation of the sun gear 46 of the second planetary gear train 22 through the connecting member 28. Similarly, the carrier 52 of the second planet gear set 48 drives the sun gear 56 of the third planetary gear train and, at the same time, the torque is transferred to the rim assembly 16 through ring gear 50 being driven by the planet gear set 48. Finally, the ring gear 56 of the third planetary gear train 24 causes rotation of the gears of the planet gear set 58, which in turn, causes rotation of the ring gear 60. Consequently, torque is transferred to the rim assembly 16 by the ring gear 60 since the carrier 62 is being held stationary by the reaction member 64.

Referring to FIG. 2, exemplary overall reduction ratios, or as the case may be, amplification ratios, for given first, second and third planetary gear trains 20, 22 and 24 are provided. Notably, an overall speed modification between the input and output may be 49:1 for planetary gear train combinations without any of the planetary gear trains exceeding the individual ratio of a value of three. In other words, by combining three common sized planetary gear trains as contemplated, a significant overall speed modification is obtainable within a compact space.

Moreover, since planetary gear train size is kept modest, as a result, slow carrier rotational velocities are obtained which means that there will be low "g" forces on the planet gear bearings and certain pinion bearings. Additionally, since the rotational velocities are low, as a result, there exists little if any parasitic losses due to the churning of gears in lubrication oil. Moreover, the ability to lubricate such moving parts is increased when they are rotating at such lower speeds.

It will be apparent to those skilled in the art that various modifications and variations can be made in the disclosed final drive assembly without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A final drive assembly for transmitting torque between an input and an output, said final drive comprising: a compound gear assembly including at least three planetary gear trains and being in driving engagement with the input, each planetary gear train of said at least three planetary gear trains being adapted to collectively and drivingly engage the output directly, wherein torque generated by the input is distributed to the output by said each of said planetary gear trains;

the compound gear assembly comprising a first planetary gear train, a second planetary gear train and a third planetary gear train;

each of the first, second and third planetary gear trains including a sun gear, a ring gear and a planetary carrier; and wherein the ring gears of the second and third planetary gear trains and the planetary carrier of the first planetary gear train are connected to the output.

2. The final drive assembly of claim 1, wherein the output consists of a wheel assembly having a rim assembly, said at least three planetary gear trains are substantially enclosed by said rim assembly.

3. The final drive assembly of claim 2, wherein at least one of said at least three planetary gear trains is positioned inboard relative to said wheel assembly.

4. The final drive assembly of claim 1, wherein the input includes one of an electric drive motor, a hydraulic motor, an internal combustion engine and a hybrid source.

5. The final drive assembly of claim 1, wherein said compound gear assembly includes an outboard planetary gear train drivingly engaged by the input.

6. The final drive assembly of claim 1, wherein said sun gears of said second and third planetary gear trains are coaxially positioned.

7. The final drive assembly of claim 6, wherein the input is drivingly engaged with said sun gear of said first planetary gear train, said ring gear of said first planetary gear train is connected with said sun gear of said second planetary gear train, and said planetary carrier of said second planetary gear train is connected with said sun gear of said third planetary gear train.

8. The final drive assembly of claim 6, wherein said first planetary gear train is adapted to be driven by the input and said third planetary gear train includes a portion thereof adapted to be grounded through a reaction member.

9. The final drive assembly of claim 1, wherein a speed modification ratio between the input and output generated through the compound gear assembly is at least 49:1.

10. A machine having an input, comprising:

at least one output; and at least one final drive assembly structured and arranged to transmit rotation between the input and the output, said final drive assembly including a compound gear assembly comprising at least three planetary gear trains and being in driving engagement with the input, said at least three planetary gear trains being adapted to collectively drivingly engage said output directly, wherein torque generated by the input is distributed to said output by said planetary gear trains;

the compound gear assembly comprising a first planetary gear train, a second planetary gear train and a third planetary gear train;

wherein each of the first, second and third planetary gear trains including a sun gear, a ring gear and a planetary carrier; and the input drivingly engaging the sun gear of the first planetary gear train;

wherein the ring gear of the first planetary gear train is connected with the sun gear of the second planetary gear train.

11. The machine of claim 10, wherein said output of said at least one final drive assembly includes a wheel assembly having a rim assembly, said at least three planetary gear trains are substantially enclosed by said rim assembly.

12. The machine of claim 11, wherein at least one of said at least three planetary gear trains of said at least one final drive assembly is positioned inboard relative to said wheel assembly.

13. The machine of claim 10, wherein the input includes one of an electric drive motor, a hydraulic motor and a hybrid source.

14. The machine of claim 10, wherein said compound gear assembly of said at least one final drive assembly includes an outboard planetary gear train drivingly engaged by the input.

15. The machine of claim 10, wherein said sun gears of said second and third planetary gear trains are coaxially positioned.

16. The machine of claim 15, wherein said planetary carrier of said second planetary gear train is connected with said sun gear of said third planetary gear train, said ring gears of said second and third planetary gear trains and said planetary carrier of said first planetary gear train are connected to the output.

17. The machine of claim 15, wherein said first planetary gear train of said at least one final drive assembly is adapted to be driven by the input and said third planetary gear train includes a portion thereof adapted to be grounded through a reaction member.

18. The machine of claim 10, wherein a speed modification ratio between the input and output generated through the compound gear assembly of said at least one final drive assembly is at least 49:1.

19. The final drive assembly of claim 1, wherein said at least three planetary gear trains have approximately equal gear ratios.

20. A final drive assembly for transmitting torque between an input and an output, said final drive comprising:

a compound gear assembly including at least three planetary gear trains and being in driving engagement with the input, said at least three planetary gear trains being adapted to collectively and drivingly engage the output, and an outboard planetary gear train of said at least three planetary gear trains being directly and drivingly engaged by the input, wherein torque generated by the input is distributed to the output by said at least three planetary gear trains;

wherein the compound gear assembly comprises a first planetary gear train, a second planetary gear train and a third planetary gear train;

each of the first, second and third planetary gear trains including a sun gear, a ring gear and a planetary carrier;

the input being drivingly engaged with the sun gear of the first planetary gear train; and the planetary carrier of the first planetary gear train being connected to the output.

* * * * *